Jan. 26, 1937. H. A. W. KLINKHAMER 2,068,883
DIRECT CURRENT WELDING APPARATUS
Filed April 1, 1932
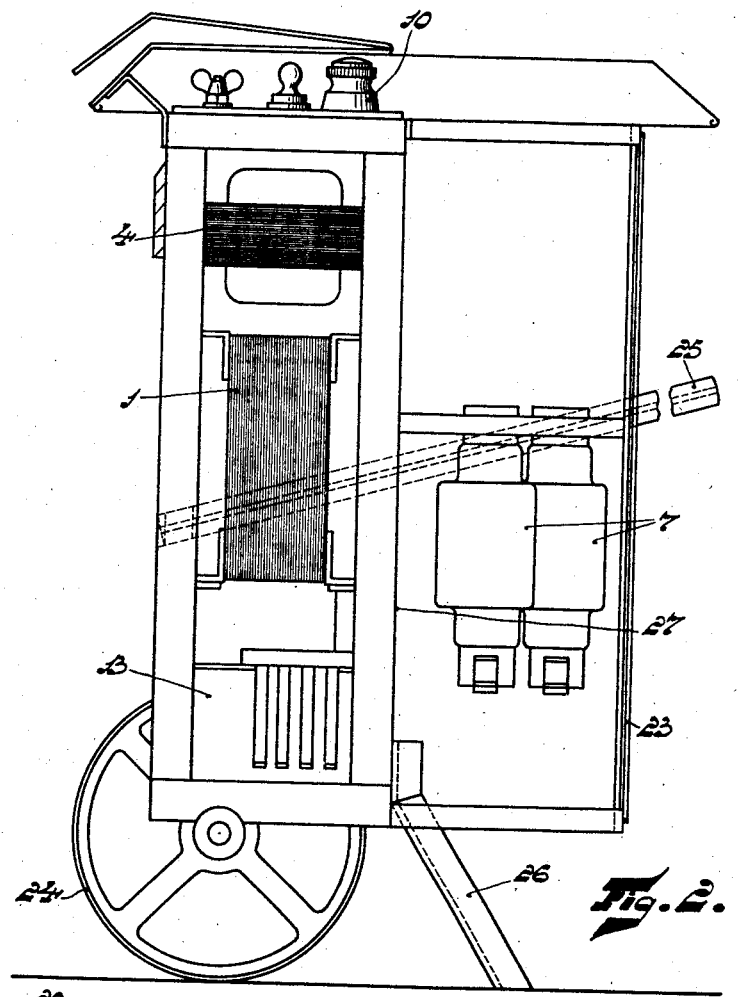
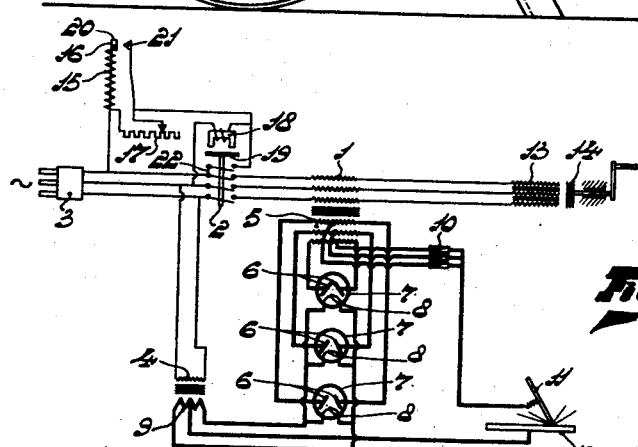
Inventor:
H. A. W. Klinkhamer,
by
Att'y.

Patented Jan. 26, 1937

2,068,883

UNITED STATES PATENT OFFICE 2,068,883

DIRECT CURRENT WELDING APPARATUS

Hendrik Abraham Wijnand Klinkhamer, Eindhoven, Netherlands, assignor to N. V. Philips' Gloeilampenfabrieken, Eindhoven, Netherlands Application April 1, 1932, Serial No. 602,579
In Germany May 26, 1931

2 Claims. (Cl. 219—8)

My invention relates to welding apparatus and more particularly to a novel welding apparatus for direct-current operation.

For electric welding both alternating and direct currents are used. When welding with alternating current, as a rule a welding transformer is used. However, on account of the large and highly irregular load occurring in the welding operation and due to the fact that the transformer operates only on a single phase of the network, the power stations usually prohibit their connection to the regular network. The use of welding transformers is therefore more or less restricted to factories which have their own powerplants or at least their own high-tension transformer.

Furthermore, the welds obtained with alternating current as a rule are inferior to those obtained with direct current and therefore it is preferable to use direct current for welding.

As the regular power supply is generally alternating current the welding apparatus for direct current requires some means of rectification and such rectification for direct current welding is as a rule achieved by means of rotary converters. However, the initial cost of such converters is very high and besides, such apparatus has all of the inconveniences inherent in rotating apparatus.

For the reasons above set forth, no suitable welding apparatus has been so far available for small plants and one object of my invention is to provide a suitable low-priced direct current welding apparatus to meet this need, which apparatus at the same time has small operating losses and provides for a symmetrical loading of a three-phase network.

The direct current welding apparatus, according to the invention, comprises one or more gas-filled incandescible cathode rectifying tubes for the supply of the D. C. welding current.

While it has been already proposed to use rectifying tubes in connection with electric welding, such rectifying tubes were used not for the supply but for the control of the welding current. For such purpose use has been made of rectifying tubes having positive characteristics in which tubes the voltage drop greatly increases with increasing load, so that the current is prevented from rising beyond a predetermined value.

Also for controlling the welding current, use has been made of tubes in which the temperature of the incandescent cathode was regulated. In the high-vacuum tubes suggested for such use, the current is almost exclusively carried by electrons, and thus such tubes are only suitable for quite small currents and cannot supply the large currents required for welding.

In the welding apparatus according to the invention the rectifier tubes serve exclusively for the supply of the direct current for the welding, and the intensity of the current is controlled by other means. The tube as stated, comprises a gaseous filling and an incandescible cathode and it has been found that only under such conditions can satisfactory welding results to obtained with rectifiers.

A welding apparatus according to the invention not only provides an inexpensive and simple apparatus which combines the general advantages of direct current welding with balanced loading of a three-phase network, but also gives quite unforeseen and unexpected advantages. Such unexpected advantages seem at least partly due to the fact that the character of the welding are obtained with the apparatus of the invention is unusually favorable.

For instance, it has been found that the apparatus according to the invention makes it possible to weld thinner metal sheets than has been possible with welding dynamos or welding transformers.

Again, various materials can be welded together or the welding of parts of certain shape is rendered possible, in cases where the prior welding apparatus altogether failed.

Again, it is possible in many instances to use with my novel welding apparatus the inexpensive bare (or unprotected) electrodes, whereas for similar work with the prior arc welding apparatus, tne much more expensive, coated electrodes—electrodes the surface of which is coated with a substance promoting the welding process— were needed.

Again, with the apparatus according to my invention, the sticking of the electrodes; i. e. their welding to the work-piece, is prevented, whereas this is a frequent and objectionable occurrence in present-day welding apparatus.

Some of these advantages of the present invention are at least partly due to the fact that the gas-filled hot cathode rectifier tubes have an almost negligibly small inertia and thus the supplied current can rapidly follow the variations of the load.

A still further unexpected and surprising advantage of my apparatus is that a stable arc can be obtained at a much lower no-load voltage than is the case with a welding dynamo or welding transformer. Consequently, the personal safety of the operator is increased, whereas at the same time the power factor of the installation is improved and the dimensions of the apparatus can be smaller.

While it has already been suggested to use for the supply of the direct current for the welding operation mercury vapor rectifiers having a liquid mercury cathode, such rectifiers are not satisfactory in welding operations and the various above-mentioned advantages resulting from the use of an apparatus having a gas-filled incandescible cathode rectifier cannot be obtained with such mercury arc rectifiers.

An apparatus using a mercury cathode rectifier compares unfavorably with the present-day welding transformer or welding dynamo, among others on account of its low efficiency. The voltage drop in such mercury vapor rectifiers is quite high compared with the voltage of the welding arc, the former being about 23 volts and the latter about 22 volts.

Disregarding any further loss, the efficiency of such an apparatus would have to be less than 50%. On the other hand, in a gas-filled incandescent cathode rectifier the voltage drop can be less than 10 volts, so that efficiencies of 69% and more can be obtained.

Besides that the mercury vapor rectifier requires auxiliary equipment, among other things a separate igniting device, which further reduces the efficiency and which is highly objectionable in operation as the arc must be frequently re-established. No such igniting device is required for gas-filled incandescent cathode rectifiers. Furthermore, an apparatus according to the invention can be conveniently used as a portable apparatus, which is not the case with a mercury arc rectifier, and its dimensions may be much smaller than those of the latter.

Nor is the operation of the hot cathode gas-filled rectifier dependent upon the ambient temperature, as is the case for the mercury vapor rectifier.

Another objectionable characteristic of the mercury arc rectifier when used for welding is that its load cannot be reduced below a value of about one-quarter of the full load. No such limitation exists in the case of hot cathode gas-filled rectifiers and a welding apparatus using such rectifier has therefore a wide operating range.

The incandescent cathode employed in a rectifier tube in the welding apparatus according to my invention, is preferably an oxide cathode. Oxide cathodes afford further advantages in connection with such welding apparatus for the following reasons: During the welding operation the welding apparatus remains usually electrically connected during the time intervals of no-load. For convenient operation, the cathode of the rectifier has therefore also to remain heated during such no-load intervals. The operating temperature of an oxide cathode is so low that the heating of the cathode hardly affects its life, and in addition it requires only a very small heating energy. Thus there is no drawback in retaining the cathode at its operating temperature also during the no-load intervals.

To obtain a symmetrical load, as stated above, it is advantageous to construct the apparatus in such a manner that the rectification of the three or more phases of the alternating current takes place whereby the load is symmetrically distributed over the phases.

In order that the invention may be clearly understood and readily carried into effect, it will be explained more fully hereafter with reference to the accompanying drawing, which represents by way of example one embodiment thereof.

In the drawing forming part of the specification:

Figure 1 is a circuit diagram of a welding apparatus according to the invention;

Figure 2 is a diagrammatic side view showing a transportable welding apparatus according to the invention.

Referring to Figure 1, the primary winding of a three-phase main transformer 1 is connected through a switch 2 to a three-prong connecting plug 3, which serves for connecting the apparatus to the three-phase network. Connected between two of the phases, in their portion falling between the plug 3 and the switch 2, is the primary winding 4 of a heating transformer.

Each of the three phases of the secondary winding 5 of the transformer 1 is provided with a center tap by means of which arrangement a 6-phase winding is obtained.

Three gas-filled rectifiers 7 are provided, each comprising two anodes 6—6 and an incandescible cathode 8 which is preferably an oxide cathode. The two ends of each phase of the secondary winding 5 are connected across the two anodes 6 of one of the three rectifiers 7, and the secondary winding 9 of the heating transformer 4 is connected across the three cathodes 8.

The three center-taps of the phases of the secondary winding 5 are connected through fuses 10 to a common conductor leading to a welding electrode 11. The secondary winding 9 of the heating transformer 4 is also provided with a center tap which is connected to the workpiece 12.

In the embodiment shown the three rectifiers may together supply a welding current of, for instance, 120 amps. The adjustment of the current intensity is obtained with the aid of a choke-coil 13 connected to the primary side of the transformer 1, the adjustment being obtained by varying the air-gap of the choke-coil by the aid of a movable yoke 14.

To prevent the discharge from being initiated while the cathodes are still cold and thus causing local overheating on some points of the cathode, which would considerably reduce the life of the cathode, it is preferable to provide means, for instance a relay, which insures that the discharge through the rectifier can only take place after its cathode has been brought up to its full operating temperature.

For this purpose the heating transformer 4 is connected ahead of the switch 2 and this switch is controlled by the following relay arrangement.

The switch 2 is connected to the armature 19 of a magnet, the coil 18 of which may be excited through a branch circuit connected to two phases of the network in their portion falling between the plug 3 and the switch 2. This branch circuit goes from one phase through a heating element 15, a resistance 17 and the coil 18 back to the other phase. The current so flowing through coil 18 is yet insufficient to attract the armature 19. However, the heating wire 15 heats up a bi-metallic body 16 and the latter when so heated, causes a contact 20 to contact with a fixed contact 21, thereby fully or partly short-circuiting the resistance 17. This permits a sufficiently large current to flow through the coil 18 to cause attraction of the armature 19 and the closure of the switch 2.

The switch 2 is also provided with an additional contact 22 which, when the switch 2 is closed, short-circuits contacts 20 and 21 and directly connects the coil 18 across the two phases. The switch 2 is thus retained closed until the plug 3 is disconnected from the network.

The general arrangement of a transportable welding apparatus according to the invention is shown in Fig. 2 where the previously referred to component parts are designated by the same reference numerals as have been employed in Fig. 1.

The apparatus is surrounded by a housing 23 having wheels 24, handles 25 and feet 26.

It is advantageous to cool the rectifying tubes with the aid of a suitable fan as a given size rectifier tube can be used for a higher current output when it is cooled than when it is not cooled.

For instance, the fan may be disposed below the rectifier tubes and if, for instance, the rectifier tubes are adapted to supply 120 amps. when not cooled, they may supply 200 amps. or more, when cooled. To this end the cathodes of the rectifier tubes are also given larger dimensions.

The air current produced by the fan may be also used for the cooling of the transformers so that the latter may also carry a higher load.

What I claim as new and desire to secure by Letters Patent is:—

1. A portable D. C. welding apparatus comprising, a three-phase supply line, a three-phase supply transformer having primary windings and secondary windings, three gas-filled rectifier tubes each having two anodes connected to the ends of one of said secondary windings and an oxide-cathode, a heating transformer for said cathodes having a primary winding connected to one phase of said supply line, inductive means connected in series with said primary windings to regulate the slope of the current-voltage curve of said rectifiers and the intensity of the welding current, timing means to prevent flow of current in said supply transformer until the cathodes are heated to their operating temperature, said timing means being supplied with controlling current from a phase of said supply line other than the phase to which said heating transformer is connected, said timing means and heating transformer also serving to prevent the flow of welding current upon failure of any phase of the supply line.

2. A direct-current portable welding apparatus comprising a supply transformer having three primary windings adapted to be connected to the ordinary three-phase supply lines and three secondary windings having mid-taps connected together and to a welding electrode, three gas-filled rectifier tubes, each tube having a thermionic cathode and two anodes connected to the ends of one of said secondary windings, a heating transformer having a primary winding connected across one phase of the supply line and a secondary winding connected across said cathodes and having a mid-tap connected to a work-piece, means to control the slope of the voltage-current output curve of said rectifiers and the intensity of the welding current, said means comprising an adjustable inductance having a coil in series with each of said supply-transformer primary windings to uniformly vary the inductances of said coils, means to prevent application of voltage to said supply transformer until said cathodes have reached their operating temperature comprising a relay having three normally-open contacts each connected in series with one of the supply-transformer secondary windings and an actuating coil, a time-delay device comprising a coil, said two coils being connected in series across a phase of said supply lines other than the phase across which said heating transformer is connected, said relay and heating-transformer jointly preventing flow of welding current upon failure of any phase of said supply lines.

HENDRIK ABRAHAM
WIJNAND KLINKHAMER.